US010090888B2

(12) United States Patent
Lefevre et al.

(10) Patent No.: US 10,090,888 B2
(45) Date of Patent: Oct. 2, 2018

(54) METHOD AND DEVICE FOR LOCATING MOBILE ENTITIES PROVIDED WITH NFC TYPE STANDARD TAGS

(71) Applicant: EPAWN, Paris (FR)

(72) Inventors: Valentin Lefevre, Puteaux (FR); Laurent Chabin, Asnieres sur Seine (FR); Christophe Duteil, Paris (FR)

(73) Assignee: STARBREEZE PARIS, Paris (FR)

( * ) Notice: Subject to any disclaimer, the term of this patent is extended or adjusted under 35 U.S.C. 154(b) by 0 days.

(21) Appl. No.: 15/036,899

(22) PCT Filed: Nov. 18, 2014

(86) PCT No.: PCT/FR2014/052949
§ 371 (c)(1),
(2) Date: May 16, 2016

(87) PCT Pub. No.: WO2015/075370
PCT Pub. Date: May 28, 2015

(65) Prior Publication Data
US 2016/0301449 A1   Oct. 13, 2016

(30) Foreign Application Priority Data
Nov. 20, 2013 (FR) ...................................... 13 61437

(51) Int. Cl.
*H04B 7/00* (2006.01)
*H04B 5/00* (2006.01)
(Continued)

(52) U.S. Cl.
CPC ....... *H04B 5/0056* (2013.01); *G06K 7/10128* (2013.01); *G06K 7/10356* (2013.01); *H04W 4/02* (2013.01)

(58) Field of Classification Search
CPC .. G08B 13/2422; G08B 26/00; H04B 5/0062; H04B 5/0056; H04B 1/712; G06K 7/0008
(Continued)

(56) References Cited

U.S. PATENT DOCUMENTS 4,352,098 A * 9/1982 Stephen ............. G08B 13/2422
                                              340/572.2
4,633,315 A * 12/1986 Kasperkovitz ........... H03D 1/24
                                              348/571
(Continued)

FOREIGN PATENT DOCUMENTS

EP          0 915 429 A2    5/1999
FR          1 255 334 A     3/1961
KR     10-2013-0095451 A    8/2013

OTHER PUBLICATIONS

International Search Report, dated Feb. 10, 2015, from corresponding PCT Application.

*Primary Examiner* — William D Cumming
(74) *Attorney, Agent, or Firm* — Young & Thompson

(57) ABSTRACT

A device (200) for locating mobile elements provided with at least one standard NFC tag. The location device (200) includes transmission elements (215) for transmitting a signal to query8 the at least one tag, monitoring elements (205, 245) and a plurality of receiving elements (225) selectively connected to the monitoring elements, the receiving elements being receptive to the querying signal and to a response signal from the at least one tag. The monitoring elements are configured so as to measure in sequence signals from receiving elements connected to the monitoring elements and to estimate the position of the at least one tag by interpolating measurements.

19 Claims, 7 Drawing Sheets

(51) Int. Cl.
  *G06K 7/10* (2006.01)
  *H04W 4/02* (2018.01)

(58) Field of Classification Search
  USPC ........ 340/5.61, 572.2, 505, 10.1, 10.2, 10.5;
  455/41.1
  See application file for complete search history.

(56) References Cited

U.S. PATENT DOCUMENTS

| | | | | |
|---|---|---|---|---|
| 5,007,085 A * | 4/1991 | Greanias | .................. | G06F 3/046 178/18.01 |
| 5,763,839 A * | 6/1998 | Funahashi | ............... | G06F 3/046 117/201 |
| 5,902,244 A * | 5/1999 | Kobayashi | .......... | G01S 7/52044 600/445 |
| 7,667,572 B2 * | 2/2010 | Husak | .................. | G06K 7/0008 340/10.1 |
| 7,692,532 B2 * | 4/2010 | Fischer | ................ | G06K 7/0008 340/10.2 |
| 2002/0014987 A1 * | 2/2002 | Raggam | ............... | G06K 7/0008 342/42 |
| 2002/0109581 A1 * | 8/2002 | Blatz | ....................... | B60R 25/00 340/5.61 |
| 2004/0125011 A1 * | 7/2004 | Kumon | ................. | G01S 13/345 342/70 |
| 2004/0208235 A1 * | 10/2004 | Ishii | ....................... | H04B 1/712 375/148 |
| 2004/0246230 A1 * | 12/2004 | Oda | ......................... | G06F 3/046 345/156 |
| 2006/0022801 A1 * | 2/2006 | Husak | .................. | G06K 7/0008 340/10.5 |
| 2006/0022815 A1 * | 2/2006 | Fischer | ................ | G06K 7/0008 340/505 |
| 2011/0207401 A1 * | 8/2011 | Han | ..................... | H04B 5/0062 455/41.1 |
| 2013/0338768 A1 * | 12/2013 | Boyden | ..................... | A61F 2/12 623/8 |
| 2013/0338769 A1 * | 12/2013 | Boyden | ..................... | A61F 2/12 623/8 |
| 2013/0338770 A1 * | 12/2013 | Boyden | .............. | A61B 5/14503 623/8 |
| 2013/0338771 A1 * | 12/2013 | Boyden | ..................... | A61F 2/12 623/8 |
| 2013/0338772 A1 * | 12/2013 | Boyden | ................ | G01N 33/528 623/8 |
| 2013/0338773 A1 * | 12/2013 | Boyden | ..................... | A61F 2/12 623/8 |
| 2015/0198447 A1 * | 7/2015 | Chen | ..................... | G01S 5/0252 701/472 |
| 2016/0301449 A1 * | 10/2016 | Lefevre | ................ | H04B 5/0056 |

\* cited by examiner

METHOD AND DEVICE FOR LOCATING MOBILE ENTITIES PROVIDED WITH NFC TYPE STANDARD TAGS

FIELD OF THE INVENTION

The present invention concerns interfaces between users and computer systems, in particular in the field of games, and more particularly a method and a device for locating mobile entities provided with NFC type standard tags (NFC standing for Near Field Communication), that is to say tags using near field communication with a computer system, furthermore providing conventional functions of reading and writing.

CONTEXT OF THE INVENTION

In numerous situations, it may be necessary, for a computer system, to detect mobile entities as well as their position and/or orientation to enable the computer system to react accordingly. Thus, for example, in a game of chess enabling a user to play against a virtual player simulated by the computer system, the application implemented on the computer system must know all the pieces of the chess board and their position, in particular the pieces moved by the user and their position, to compute its move.

Solutions exist for detecting real objects on a game board using NFC technology or RFID technology (RFID standing for Radio Frequency IDentification), it being noted that NFC technology is a particular extension of RFID technology. The game board comprises an NFC type reader, also called reader NFC, generally placed under the game board. Moreover, each object is provided with an NFC type tag comprising a unique identifier. Thus, by performing reading of all the NFC tags situated near the game board, it is possible to detect all the objects present on the game board. However, such a system does not generally make it possible to accurately determine the position and/or the orientation of the objects.

There are also solutions for detecting real objects on a game board and for determining their position and/or orientation making it possible to use those objects as an interface for a computer system.

Thus, for example, a technology developed by the company N TRIG consists of equipping NFC tags with a contact point making it possible to establish a contact with a capacitive surface of a screen. The location of the contact point enables the NFC tag to be located. Such a solution however requires a modification to the NFC tags leading to an increase in their manufacturing costs as well as the use of a capacitive surface of which the price is significant.

Solutions also exist using, in the NFC reader, several antennae able to be used sequentially by multiplexing. Each antenna corresponding to a square of a game board makes it possible to detect the presence of an NFC tag on the corresponding square and to obtain its identifier. Knowing the position of the antenna, it is possible to deduce therefrom the position of the NFC tag. The accuracy is here linked to the size of the squares comprising the antennae. Such squares may, for example, be squares measuring 4 cm by 4 cm. The accuracy is then 4 cm. However, although such a solution may enable the use of standard NFC tags, it requires all the positions at which it must be possible to detect NFC tags to be predetermined.

SUMMARY OF THE INVENTION

The invention enables at least one of the problems set forth above to be solved.

The invention thus relates to a device for locating at least one mobile entity provided with at least one tag using a near field communication technology, said device comprising the following means,
- emission means for emitting an interrogation signal for interrogating said at least one tag;
- control means;
- a plurality of reception means selectively linked to said control means, said reception means being receptive to said interrogation signal and to a response signal from said at least one tag;

said control means being configured to sequentially measure signals coming from reception means linked to said control means and to estimate the position of said at least one tag by interpolating measurements.

The device according to the invention thus makes it possible to know in real time the number of tags using a near field communication technology, that are present near a detection surface, the identifiers of those tags as well as their position with an accuracy able to be less than the millimeter. The tags used may in particular be standard tags, in particular tags of NFC type, for example bipolar NFC tags comprising an antenna using a carrier frequency of 13.56 MHz.

According to a particular embodiment, the device further comprises switching means controlled by said control means for sequentially selecting said reception means. The device according to the invention thus makes it possible to improve the accuracy of locating tags, in a simple way.

According to a particular embodiment, the device further comprises adaptation means for tuning said reception means to the frequency of a carrier of a signal emitted by said emission means.

According to a particular embodiment, the method further comprises a specific component connected to said control means and to said emission means for executing specific functions for reading tags.

According to a particular embodiment, said control means comprise means for determining a value representing the amplitude of a component corresponding to a carrier of a signal received via said reception means.

According to a particular embodiment, said control means comprise means for determining a value representing the amplitude of a useful component of a signal received via said reception means, said useful component being used for exchanging data.

According to a particular embodiment, said reception means comprise at least one set of loops extending in at least one dimension of a surface on which the position of said at least one tag must be estimated.

According to a particular embodiment, each said reception means comprises two parts, each of said two parts being situated on respective opposite sides of said emission means. The device thus makes it possible to improve the location of tags.

According to a particular embodiment, said emission means and said control means are configured to read at least one item of data stored in memory on said at least one tag or to write at least one item of data on said at least one tag. The device according to the invention provides standard functions of reading or writing on those tags.

According to a particular embodiment, the device further comprises selection means and processing means selectively linked to said reception means and to said control means, said selection means, said processing means and said control means being configured to determine the position of at least one tag implementing a communication technology distinct from near field communication technology. The device according to the invention is thus capable of determining the position of standard tags using near field communication technology and of tags using a different communication technology.

The invention also relates to a method of locating at least one mobile entity provided with at least one tag using a near field communication technology, the method being implemented in a device comprising emission means for emitting at least one interrogation signal for interrogating at least one tag, control means and a plurality of reception means selectively linked to said control means and receptive of signals emitted by said emission means and by at least one tag, the method comprising the following steps, actuating emission of an interrogation signal for interrogating said at least one tag;
sequentially selecting reception means and measuring at least one signal received via said selected reception means, said received signal resulting from at least one signal emitted by said emission means and a signal emitted by at least one tag in response to said signal emitted by said emission means; and
estimating the position of said at least one tag by interpolating measurements of signals received via selected reception means.

The method according to the invention thus makes it possible to know in real time the number of tags using a near field communication technology, that are present near a detection surface, the identifiers of those tags as well as their position with an accuracy able to be less than the millimeter. The tags used may in particular be standard tags, in particular tags of NFC type, for example bipolar NFC tags comprising an antenna using a carrier frequency of 13.56 MHz.

According to a particular embodiment, the method comprises a first step of estimating an approximate position of said at least one tag and a second step of estimating the position of said at least one tag, said second step of estimating the position comprising said steps of actuating emission of an interrogation signal, sequentially selecting reception means and measuring at least one signal received via said selected reception means and estimating the position of said at least one tag by interpolating measurements of signals received via selected reception means.

According to a particular embodiment, said first step of estimating a position comprises a step of measuring the amplitude of a component corresponding to a carrier of a signal received via said reception means and/or the amplitude of a useful component of a signal received via said reception means, the signal being used for exchanging data.

According to a particular embodiment, the method comprises an initial step of obtaining a number of identified tags and of identifiers of the identified tags.

According to a particular embodiment, said steps of actuating emission of an interrogation signal, of sequentially selecting reception means and of measuring at least one signal received via said selected reception means and of estimating the position of said at least one tag by interpolating measurements of signals received via selected reception means are carried out for each identified tag.

According to a particular embodiment, said step of measuring at least one received signal comprises a step of measuring the amplitude of a component corresponding to a carrier or a signal received via said reception means and/or the amplitude of a useful component of a signal received via said reception means, which component is used to exchange data.

According to a particular embodiment, the method further comprises a step of reading at least one item of data stored in memory on said at least one tag or writing at least one item of data on said at least one tag. The method according to the invention thus provides standard functions of reading or writing on those tags.

The present invention also relates to a computer program comprising instructions adapted for the implementation of each of the steps of the method described earlier when said program is executed on a microcontroller. The advantages procured by that computer program are similar to those referred to above in relation to the method.

BRIEF PRESENTATION OF THE FIGURES

Other advantages, objects and features of the present invention will emerge from the following detailed description, given by way of non-limiting example, relative to the accompanying drawings in which:

FIG. 1 diagrammatically illustrates the principle of communication between a tag reader using near field communication technology and such a tag;

Figure 5A:
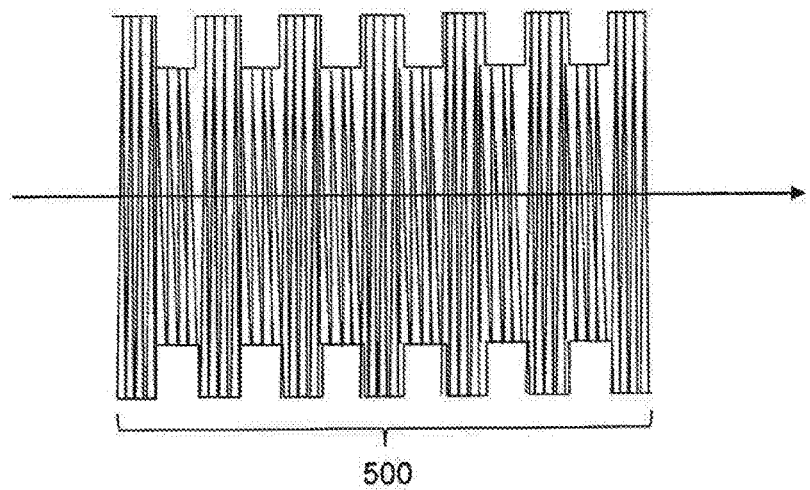
Figure 5B:
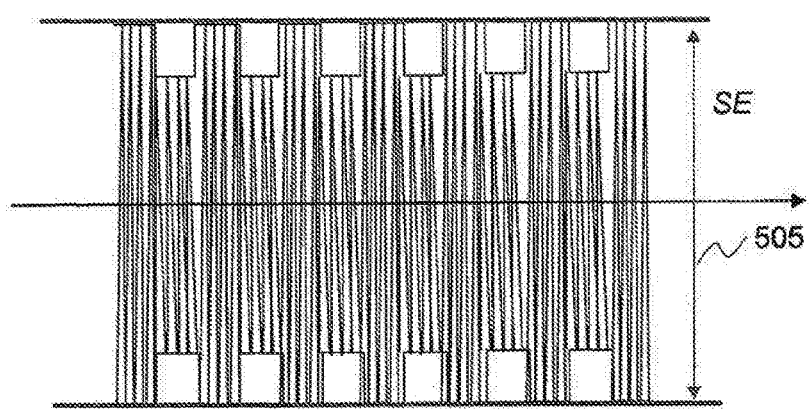
Figure 6:
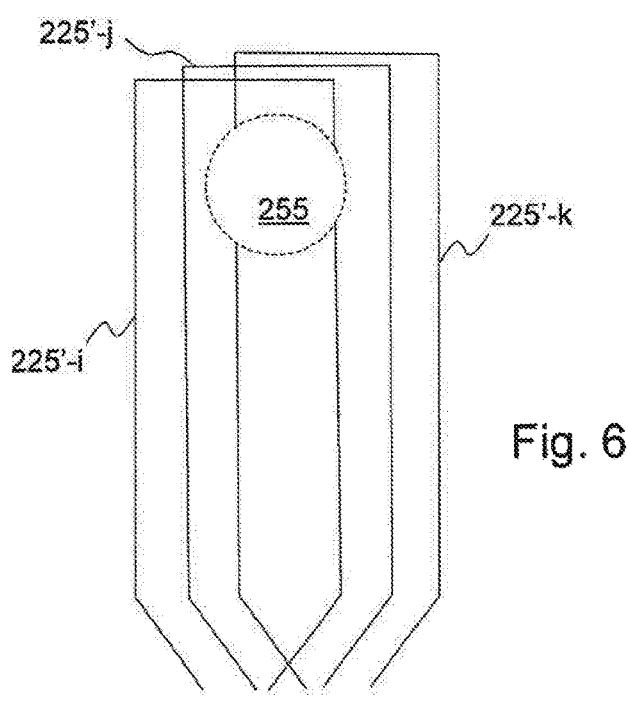
Figure 7:
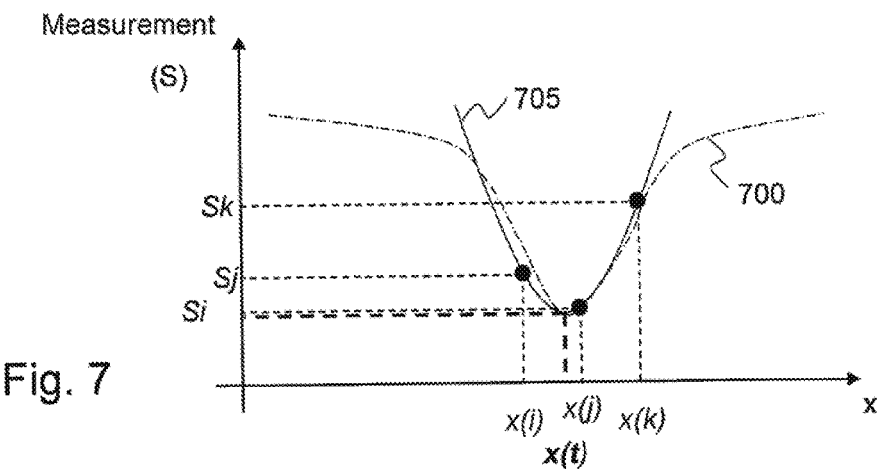
Figure 8A:
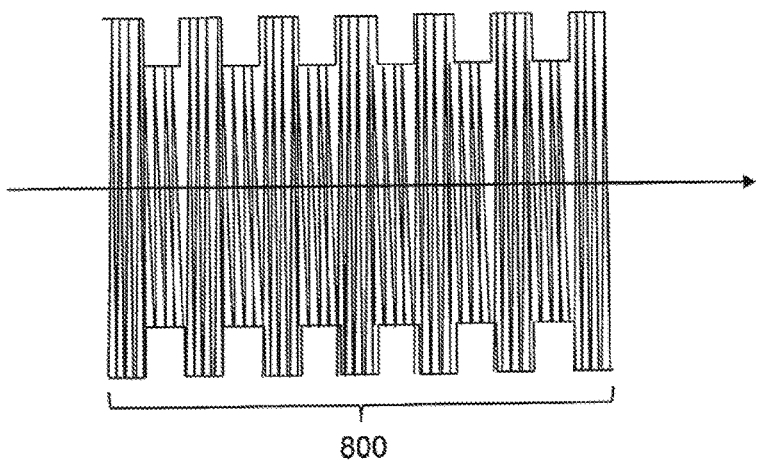
Figure 8B:
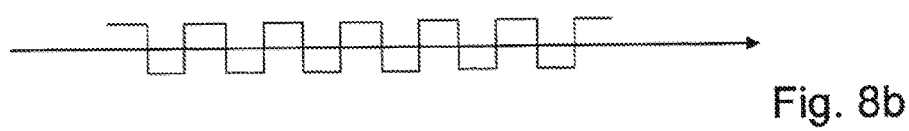
Figure 8C:
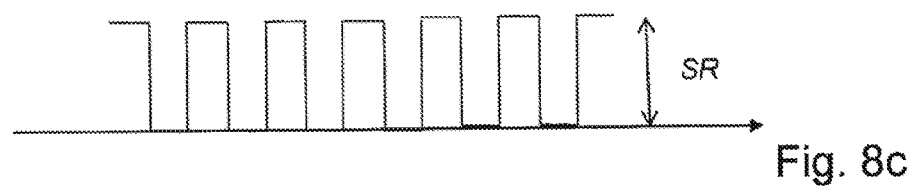
Figure 9:
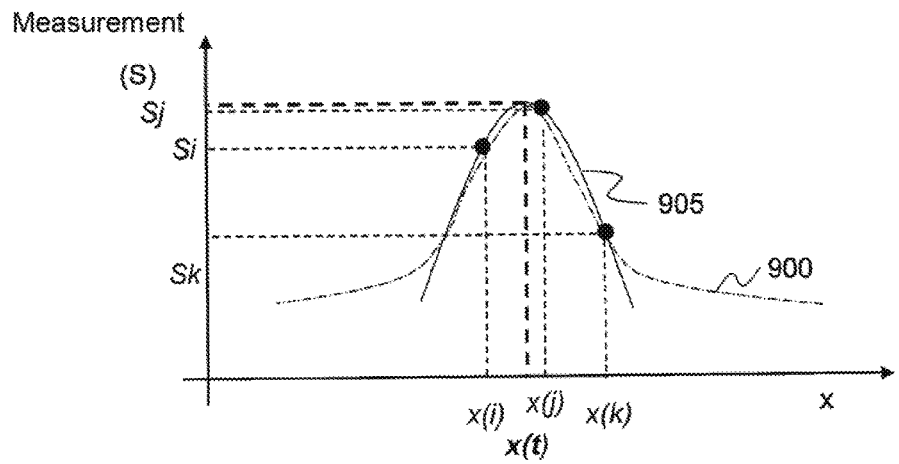
Figure 10B:
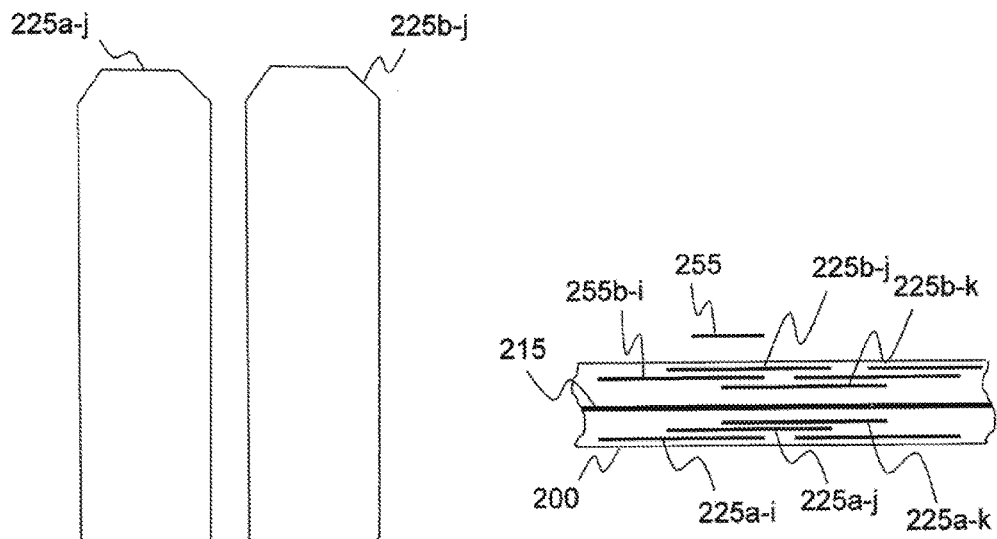
Figure 10A:
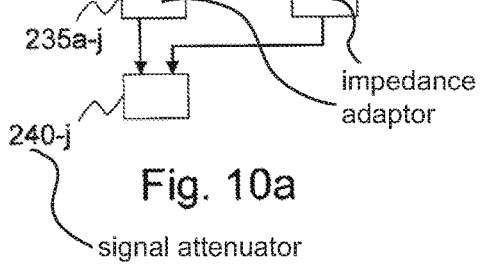
Figure 11:
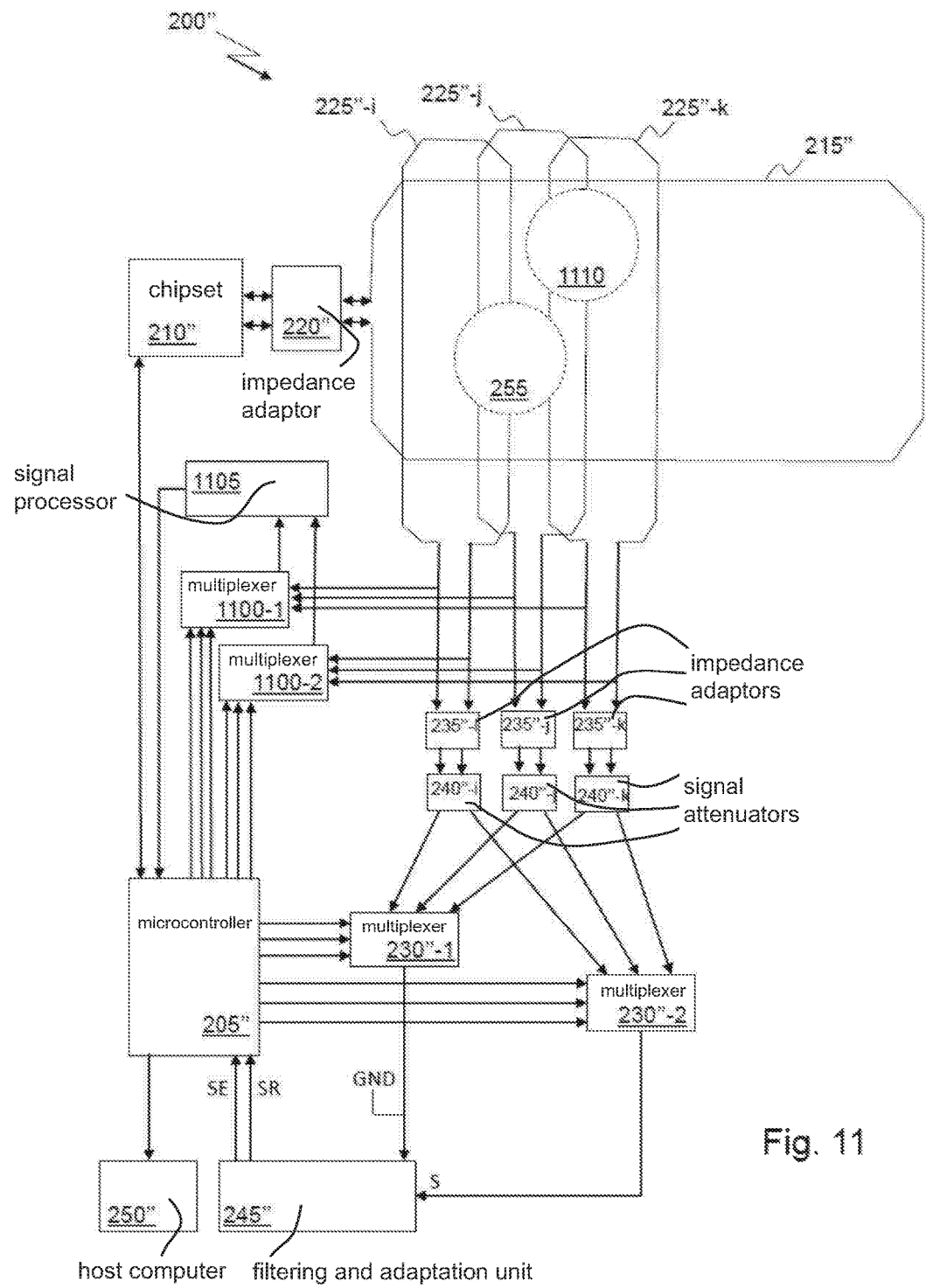

FIG. 5, comprising FIGS. 5a and 5b, illustrates the measurement of the amplitude of the component corresponding to the carrier of the signal received at the terminals of a given loop;

FIG. 6 illustrates a simplified example of configuration of loops used for estimating the x-coordinate of the position of a tag in a device such as that described with reference to FIG. 2;

FIG. 7 illustrates the theoretical variation of the amplitude of the retro-modulated carrier of a received signal according to the relative positions of the loop used (theoretically) and of the tag as well as the local approximation of the variation of that amplitude by a parabola, on the basis of measurements made using several loops, to deduce therefrom the position of a tag;

FIG. 8, comprising FIGS. 8a, 8b and 8c, illustrates the measurement of the average amplitude of the useful component (used to exchange data) of a received signal;

FIG. 9 illustrates the theoretical variation of the amplitude of the useful component of a retro-modulated signal according to the relative positions of the loop used (theoretically) and of the tag as well as the local approximation of the variation of that amplitude by a parabola, on the basis of measurements made using several loops, to deduce therefrom the position of a tag;

FIG. 10, comprising FIGS. 10a and 10b, illustrates an example of an arrangement for double loops that are used for measuring response signals from a tag and for determining therefrom the position of that tag; and FIG. 11 illustrates an example of a device enabling the location of different types of tag according to an embodiment of the invention;

DETAILED DESCRIPTION OF EMBODIMENTS OF THE INVENTION

In the interest of clarity, the following description is directed to the implementation of a tag reader and of the tags exchanging signals of which the carrier frequency is 13.56 MHz, commonly used. However, other carrier frequencies may be used. Similarly, although the tags concerned are essentially passive tags using a near field communication technology, that is to say tags of NFC type, the invention may be implemented with other type of tags, in particular RFID type tags.

It is first of all to be noted that NFC technology is a technology based on load modulation technology, also called retro-modulation.

By varying the resistance or the capacitance at the terminals of the antenna of a tag implementing this technology, that is to say by modulating the load represented by that tag, the latter modifies the energy consumption it represents in the magnetic field emitted by the tag reader used. On account of the magnetic coupling that exists between the antenna of a tag and that of the tag reader, this energy consumption tends to modify the value of the current flowing in the circuit of the tag reader antenna (this circuit also being called base station).

Figure 1:
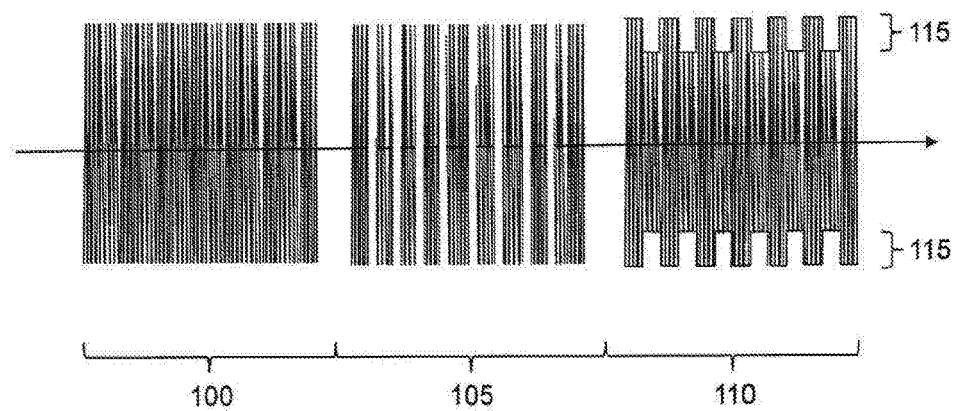

FIG. 1 diagrammatically illustrates the principle of communication between a tag reader using near field communication technology and such a tag.

In a first phase (reference 100), the antenna of the tag reader emits a signal consisting simply of a carrier, here a carrier having a frequency of 13.56 MHz, to provide the energy to the tag and to "wake it up". In a following phase (reference 105), the tag reader emits, via its antenna, an information item (typically a command) to the tag by modulating the carrier.

After having received the energy and an information item, a tag may respond (typically according to the information item received, by comparison with an information item stored in memory in advance), in a following phase (reference 110), by changing the impedance of its antenna, for example by using a switch to short-circuit or not to short-circuit its antenna. Such changes enable level modifications to be made to the carrier emitted by the antenna of the tag reader as illustrated in FIG. 1 (reference 115).

These level modifications are detected and decoded by the tag reader. The decoding makes it possible to form a bitstream representing the response of the tag. As the latter does not respond directly by a radio technology but by using this phenomenon of mismatching the coupling, this technique is called reaction by retro-modulation.

As illustrated in FIG. 1, the part of the signal resulting from the reaction by retro-modulation (reference 115) comprises a component corresponding to the carrier and a useful component, represented in the form of crenels, enabling the transfer of data.

It is noted here that the signals exchanged between a tag reader and a tag are scrambled to make the exchanges more reliable. The nature of the scrambling is such that the binary distribution of the high states and low states is homogenous (on average there are as many bits in the high state as in the low state).

According to a general embodiment, a set of imbricated loops is place above and/or below the tag reader antenna, thereby forming a detection surface. The set of loops here comprises two types of loops, horizontal loops forming rows and vertical loops forming columns. They delimit the detection surface. The loops forming the rows are used to determine the y-coordinate of the position of a tag and the loops forming the columns are used to determine the x-coordinate of the position of the tag.

These loops receive the signal emitted by the tag reader antenna, placed under them. They are tuned to the frequency of the carrier emitted by the tag reader antenna, for example a carrier having a frequency of 13.56 MHz. The quality factor of the tuning of the loops is preferably adjusted to limit the absorption of the electromagnetic field emitted by the tag reader antenna, while ensuring the minimum level of power is received for proper location.

When a tag is placed on the detection surface, that is to say over the tag reader antenna and the set of loops, and an interrogation is emitted by the tag reader, the tag placed on the detection surface is slightly detuned relative to the inductive coupling between the loops on which it is placed and the tag reader antenna. This detuning is measured on several loops to estimate, by interpolation, the position of the tag.

More specifically, the set of loops is configured such that several adjacent imbricated loops are detuned, preferably at least three, by the presence of a tag. The measurement of characteristics of the signal at the terminals of these three adjacent loops (signal corresponding to the carrier emitted by the tag reader, modified by a retro-modulation reaction linked to a tag response) then makes it possible, by interpolation, to compute the exact position of the tag in a coordinate system linked to the detection surface.

According to a particular embodiment (described more specifically with reference to FIGS. 5 to 7), the determination of the position of a tag is made by measuring the amplitude of the component corresponding to the carrier of the signal received at the terminals of each of three adjacent imbricated loops (this carrier typically having a frequency of 13.56 MHz).

According to another particular embodiment (more specifically described with reference to FIGS. 8 and 9), able to be combined or not combined with the preceding one, the determination of the position of a tag is made by measuring the amplitude of the useful component (used to exchange data) of the signal received at the terminals of each of three adjacent imbricated loops.

These embodiments may be implemented with the device described with reference to FIG. 2. To be precise, the filtering and amplification unit used may, preferably, provide both signals (amplitude of the component corresponding to the carrier of a signal received at the terminals of a loop and amplitude of the useful component of a signal received at the terminals of a loop) to a microcontroller in charge of determining the position of a tag.

According to a particular configuration, each loop has a shape close to a rectangle. The length of the loops forming the rows is, preferably, substantially equal to the width of the zone for location of the tags (i.e. the detection surface). Similarly, the length of the loops forming the columns is, preferably, substantially equal to the height of the zone for location of the tags. Even though it is not necessary, the widths of the loops forming the rows are substantially equal to each other, the width of the loops forming the columns are substantially equal to each other and the width of the loops forming the rows is substantially equal to that of the loops forming the columns.

The tags here have a smaller antenna area than the area of the location zone. It is noted that when the tags have antennae of circular shape (typically a spiral), the amplitude of the field detected by the loops forming the rows and the columns is maximized when the width of those loops is substantially equal to the diameter of the antenna of the tags.

In the case of tags having antennae of more complex shape, for example rectangular, an optimization of the coupling may be made by adjusting the width of the loops.

Figure 2:
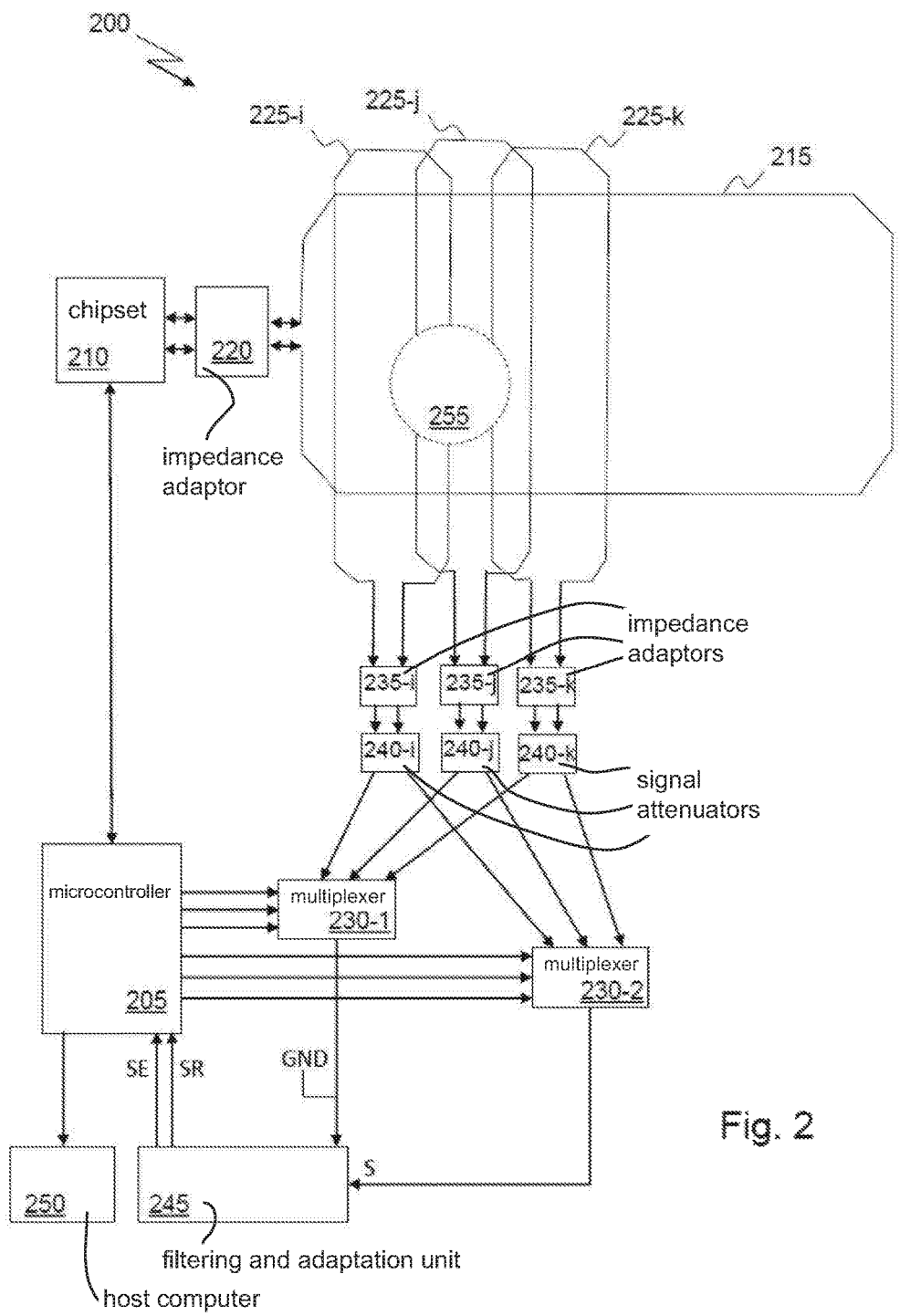
FIG. 2 illustrates an example of a device enabling the location of tags according to an embodiment of the invention.

FIG. 2 illustrates an example of a device enabling the location of tags according to an embodiment of the invention. This device here comprises a tag reader.

It should be noted that, in the interest of clarity, only three vertical loops are illustrated. However, the set of loops comprises more than three loops, their number being determined according to their dimensions and the dimension of the detection surface, and comprises vertical loops and horizontal loops as described above. Similarly, the representation of these loops is diagrammatic. Their arrangement is described with reference to FIGS. 6 and 10.

As illustrated, the device 200 here comprises a microcontroller 205 (also denoted MCU) to which is connected a specific component 210 (called a chipset) for executing specific functions of a tag reader. An antenna 215 enabling the reading and/or the writing of tags is connected to the chipset 210 via an impedance adaptor 220 (called antenna matching). The parts 210, 215 and 220 are standard tag reader parts for enabling the reading of data stored in memory on a tag and the writing of data on a tag.

The device 200 further comprises loops, in particular the vertical loops 225-$i$, 225-$j$ and 225-$k$. It also comprises horizontal loops (not shown). As illustrated, the terminals of the vertical loops represented are linked to multiplexers 230-1 and 230-2 via impedance adaptors 235-$i$, 235-$j$ and 235-$k$ and signal attenuators 240-$i$, 240-$j$ and 240-$k$, respectively.

Thus, for example, one of the terminals of the loop 225-$i$ is connected to the multiplexer 230-1 via the impedance adaptor 235-$i$ and the signal attenuator 240-$i$ while the other terminal of the loop 225-$i$ is connected to the multiplexer 230-2 via the same impedance adaptor 235-$i$ and the same signal attenuator 240-$i$. The terminals of the loops 225-$j$ and 225-$k$ are linked in similar manner to the multiplexers 230-1 and 230-2.

The loops used, in particular the loops 225-$i$, 225-$j$ and 225-$k$ are tuned to the frequency of the carrier emitted by the antenna 215 of the tag reader, for example the frequency 13.56 MHz. This tuning is performed here by impedance adaptors, in particular the impedance adaptors 235-$i$, 235-$j$ and 235-$k$. Such impedance adaptors typically consist of an RLC circuit making it possible to obtain a resonance frequency corresponding to the frequency of the carrier emitted by the tag reader antenna (typically 13.56 MHz). On resonance, each loop thus detects the signal comprising the carrier emitted by the antenna 215 of the tag reader.

The signal attenuators used (in particular the attenuators of signals 240-$i$, 240-$j$ and 240-$k$) have the purpose of attenuating the signals received from the impedance adaptors in order to limit the voltage of the signals sent to the multiplexers 230-1 and 230-2. The maximum voltage of these signals is generally the supply voltage of the device 200.

The signal attenuators may each be constituted by a network of resistors or by a resistance mounted in series, the value of those resistors being determined according to the power of the signal emitted by the antenna 215 of the tag reader.

The output from the multiplexers 230-1 and 230-2, controlled by the microcontroller 205, is directed to a filtering and adaptation unit 245. One of these outputs, for example the output from multiplexer 230-1, is connected to the ground denoted GND. The other output, here the output from multiplexer 230-1, represents the output signal S from one of the loops (according to the multiplexer command).

The unit for filtering and adaptation 245 is connected to the microcontroller 205 to send it the signal SE representing the amplitude of the component corresponding to the carrier of the signal S received at the terminals of the loop to which it is connected (via the multiplexers 230-1 and 230-2), that is to say the amplitude of the envelope of the carrier of the signal S received by that loop and/or the signal SR representing the amplitude of the useful component (used to exchange data) of the signal received at the terminals of the loop to which that unit is connected.

Lastly, the microcontroller 205 is also linked to a host computer 250 which controls the microcontroller 205 according to the application needs, for example according to the rules of a game executed by the host computer 250, and to which are sent the estimated positions of tags (as well as, preferably, the number of tags and their identifiers).

The device 200 thus comprises a set of loops each linked to an impedance adaptor and a signal attenuator and, selectively to a filtering and adaptation unit.

It is noted here that the loops are not connected together (there is no common ground). It is thus possible to isolate the loops from each other and thus avoid propagating a signal received by one loop to other loops.

The microcontroller 205 addresses the multiplexers 230-1 et 230-2, in parallel, to select a particular loop on which measurements are made. Thus, the multiplexer 230-1 makes it possible to connect one of the terminals of a particular loop to ground while the multiplexer 230-2 makes it possible to connect the other terminal of that loop to a filtering and adaptation unit 245 to send the signal S to measure to that unit.

Figure 3:
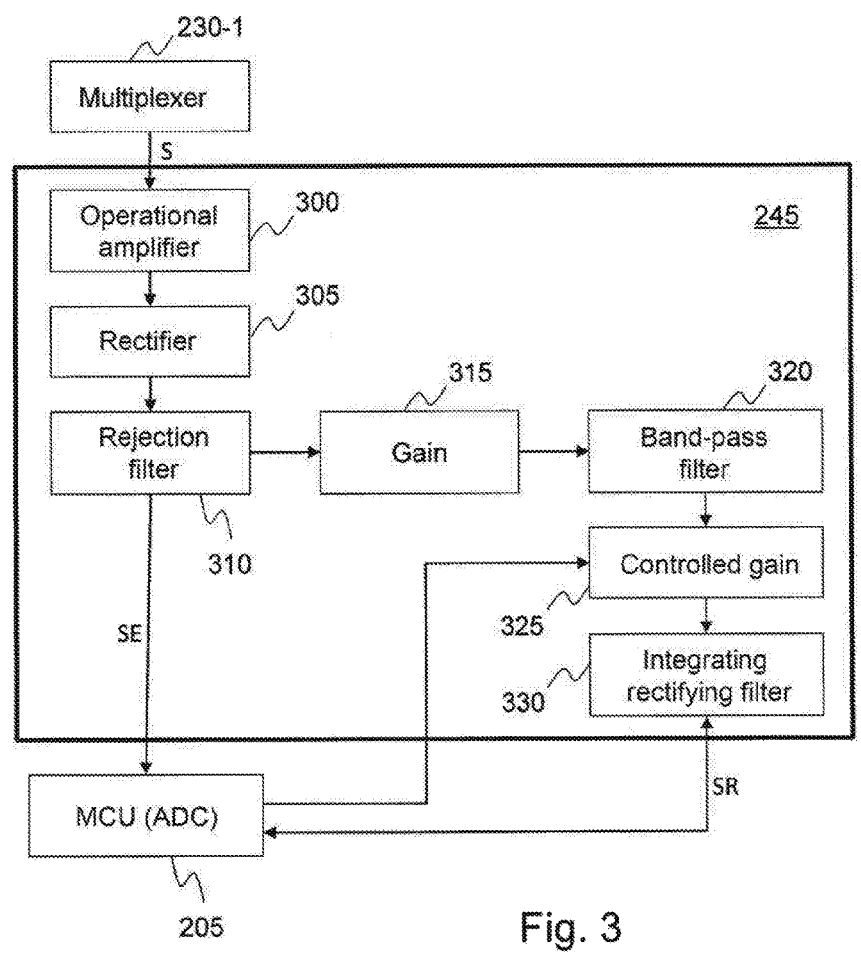
FIG. 3 illustrates an example of architecture of the filtering and adaptation unit represented in FIG. 2.

The device 200 enables the position of a tag 255 to be estimated. FIG. 3 illustrates an example of architecture of the filtering and adaptation unit 245 represented in FIG. 2.

The filtering and adaptation unit 245 essentially has two functions.

extraction of the component corresponding to the carrier of the signal S received at the terminals of the loop to which that unit is connected, typically a carrier having a frequency of 13.56 MHz, to enable the sending of a signal SE representing the amplitude of that component; and extraction of the bitstream emitted by the tag interrogated, while preserving the information on amplitude of the retro-modulated signal S obtained at the terminals of the loop to which that unit is connected, to enable the sending of a signal SR representing the amplitude of the useful component (used to exchange data) of the signal received at the terminals of the loop to which that unit is connected.

The filtering and adaptation unit 245 linked, at the input, to the multiplexer 230-1 and, at the output, to the microcontroller 205 comprises an operational amplifier 300 to amplify the received signal, a first rectifier 305 to cut part of the amplified signal and a rejection filter 310 to attenuate the contribution of the carrier frequency (typically 13.56 MHz). The output of the rejection filter 310 is a voltage which represents the amplitude of the component corresponding to the carrier of the signal received (signal SE).

Moreover, the filtering and adaptation unit 245 comprises a gain element 315 and a band-pass filter 320 to extract the bitstream resulting from the response from the tag interrogated. The terminals of the band-pass filter used may be of the order of 26 KHz and 213 KHz. A gain controller 325 is used to increase the range of the filtered signal where the circuit does not saturate. Lastly, an integrating rectifying filter attenuates the noise at high frequency of the signal by summing and rectifies the signal to positive voltages to enable an analog-digital conversion within the microcontroller 205. Each bit sent by the interrogated tag make the integrating filter execute an integration step.

It is first of all to be recalled here that the binary distribution of the high states and of the low states in the bitstream resulting from the response from a tag is homogenous and that, therefore, the integration of that signal represents its amplitude.

It is also observed that although the NFC standard may impose a response from the interrogated tag within a maximum time following its interrogation, the response is made, in practice, after a constant time following a reading command.

This time may be characterized in the laboratory or be evaluated by the microcontroller 205 for each tag, by measuring the time between the command and the response from the reading coming from the chipset 210. This time includes the response times of the entire processing chain and comprises the response time of the tag. As the part of the time independent of the tag may be pre-characterized in the laboratory (it does not vary), the time due to the tag may be easily determined.

Further to the subtraction of the part of the time independent of the tag from the observed response time, the microcontroller stores the time due to the tag in memory. This time being determined, the microcontroller is able to relax the "reset" of the integrator just before the start of the response phase of the tag interrogated.

In order for the filter to have the time to integrate data over a sufficiently long period to obtain good accuracy for the measurement of the power received (that is to say of the amplitude of the useful component), the reading commands for tags must request to read a minimum of bits or bytes.

The output from the integrating rectifying filter 330 corresponds to the signal SR representing the amplitude of the useful component of the signal received at the terminals of the loop to which the unit 245 is connected.

Figure 4:
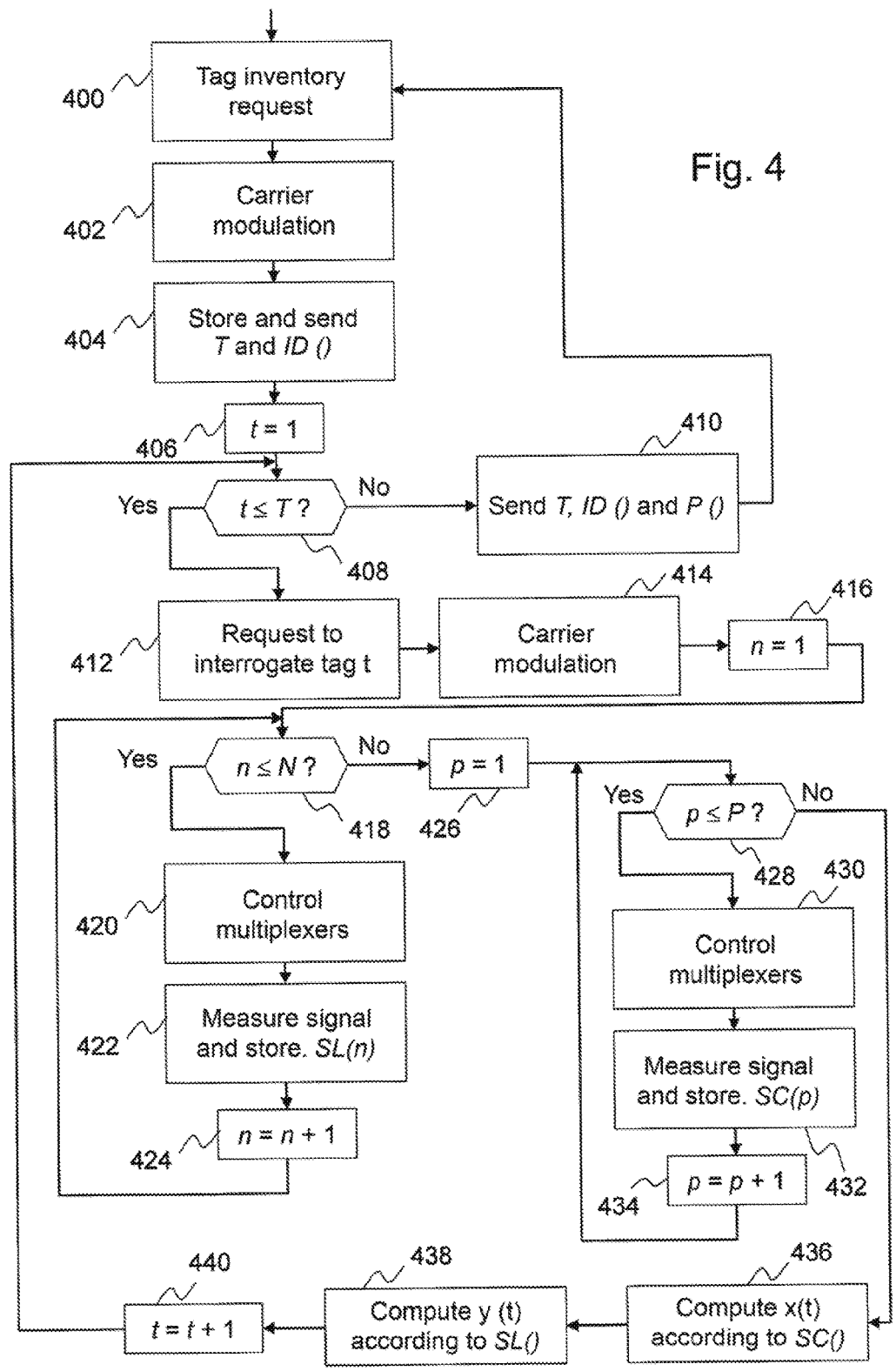
FIG. 4 illustrates an example from Descartes of the software embedded in the microcontroller represented in FIG. 2, that is to say an example of steps implemented in the device described with reference to FIGS. 2 and 3 for determining the position of tags on a detection surface and enabling the reading and the writing of data with a tag.

FIG. 4 illustrates an example from Descartes of the software embedded in the microcontroller represented in FIG. 2, that is to say an example of steps implemented in the device described with reference to FIGS. 2 and 3 for determining the position of tags on a detection surface and enabling the reading of data stored in memory in tags and the writing of data on tags.

The execution of these steps is controlled here by the microcontroller 205 which for example comprises firmware adapted for that control.

As illustrated, a first step (step 400) is directed to transmitting an inventory request to all the tags present on the detection surface in order to obtain the number of tags and their identifiers. Such a request is here sent by the microcontroller 205 to the chipset 210. It is, for example, a request in accordance with the SPI standard (SPI standing for Serial Peripheral Interface).

It is noted here that the distribution of the tasks between the microcontroller 205 and the chipset 210 may vary according to the firmware of the microcontroller 205 and the type of chipset 210 used. According to the example illustrated in FIG. 4, the chipset 210 takes on the task of obtaining the number of tags present on the detection surface and their identifiers.

Thus, after having received an inventory request, the chipset 210 modulates the carrier emitted by the tag reader antenna to encode an identification command for the tags (step 402).

The chipset 210 decodes the responses received in order to count the number of tags, denoted T, present and store in memory their identifiers in a table here referenced ID( ). The number of tags and the table of tag identifiers are then sent to the microcontroller 205 (step 404). Again, the SPI standard may be used for this sending.

A variable t representing a tag index from among all the identified tags is initialized to the value 1 (step 406).

A test is then carried out to determine whether the value of the index t is less than or equal to the variable T (step 408). If the value of the index t is greater than the variable T, the variable T, the table of identifiers ID( ) and a table P( ) representing the positions of the tags identified are sent by the microcontroller 205 to the host computer 250 (step 410).

The algorithm then returns to step 400 to re-perform a tag identification and location cycle. Such a return may be automatic and/or controlled by the host computer 250.

On the contrary, if the value of the index t is less than or equal to the variable T, a request for interrogation of the tag having the index t is sent by the microcontroller 205 to the chipset 210 (step 412). Again, it may be a request in accordance with the SPI standard.

After having received an interrogation request, the chipset 210 modulates the carrier emitted by the tag reader antenna to encode the interrogation command (step 414).

A variable n representing a loop index from among all the loops forming the rows, considering that the device represented in FIG. 2 comprises N loops forming rows, is initialized to the value 1 (step 416).

A test is then carried out to determine whether the value of the index n is less than or equal to the variable N (step 418).

If the value of the index n is less than or equal to the variable N, the microcontroller commands the multiplexers 230-1 and 230-2 to connect a terminal of the loop n to the ground and the other terminal of that loop to the filtering and adaptation unit 245 (step 420).

According to the embodiment implemented, the amplitude of the component corresponding to the carrier of the signal received (signal SE) and/or the amplitude of the useful component (used to exchange data) of the received signal (signal SR) are sent to the microcontroller 205 where they are converted (analog-digital conversion) then stored in a table SL( ) (step 422).

The variable n is then incremented by one (step 424) and the algorithm continues at step 418.

If the value of the index n is greater than the variable N, a variable p representing an index of a loop from among all the loops forming the columns, considering that the device represented in FIG. 2 comprises P loops forming columns, is initialized to the value 1 (step 426).

A test is then carried out to determine whether the value of the index p is less than or equal to the variable P (step 428).

If the value of the index p is less than or equal to the variable P, the microcontroller commands the multiplexers 230-1 and 230-2 to connect a terminal of the loop p to the ground and the other terminal of that loop to the filtering and adaptation unit 245 (step 430).

According to the embodiment implemented, the amplitude of the component corresponding to the carrier of the signal received (signal SE) and/or the amplitude of the useful component (used to exchange data) of the received signal (signal SR) are sent to the microcontroller 205 where they are converted (analog-digital conversion) then stored in a table SC( ) (step 432). The variable p is then incremented by one (step 434) and the algorithm continues at step 428.

On the contrary, if the value of the index p is greater than the variable P, the x-coordinate of the tag t, denoted x(t), in a coordinate system linked to the detection surface, is computed on the basis of the values stored in the table SC( ) (step 436) and the y-coordinate of the tag t, denoted y(t), in the same coordinate system, is computed on the basis of the values stored in the table SL( ). The values x(t) and y(t) are stored in the table P( ).

The index t is next incremented by one (step 440) and the algorithm continues at the step 408.

It should be noted that although, in the interest of clarity, the loops are addressed one by one by a single filtering and adaptation unit 245, it is possible to use several filtering and adaptation units to perform measurements in parallel. Thus, for example, it is possible to use two filtering and adaptation units, one receiving a signal from coming from one of the loops forming the rows and the other coming from one of the loops forming the columns.

As indicated earlier, the fact of positioning a tag near loops used locally detunes the inductive coupling of the loops.

According to a first embodiment, a measurement of the amplitude of the component corresponding to the carrier of the received signal (signal SE) is made for each loop.

Advantageously, to avoid a measurement of the signals at the terminals of each loop, the determination of the position of a tag comprises two phases, a so-called "search" phase and a so-called "tracking" phase. In the interest of clarity, these two phases are not illustrated in FIG. 4 in which only one measurement is made in systematic manner over the set of loops for each identified tag.

In the "search" phase, the tag of which the position it to be estimated is located approximately, that is to say, for example, to the nearest one or two loops. This first location is performed by sampling the power of the signal SE coming from one loop out of two or one loop out of three (of the set of loops). To be precise, the measured signal presents a local minimum for the rows and a local minimum for the columns situated near the tag of which the position it to be estimated.

In the "tracking" phase, the amplitude of the received signal is only measured for the three or five adjacent loops centered on each of the two loops defining the rows and the columns which have presented a local minimum for the signal SE.

This measurement cycle is repeated sufficiently rapidly such that between two series of measurements, the position of the local minimum always remains in a position that is central or offset by one loop at the most. The group of three or five measured loops is chosen dynamically to recenter the local minimum. An extrapolation of the movement of the tag on the basis of the change in the position of the tag over the preceding cycles makes it possible to better locate the local minimum in the current cycle.

In this embodiment, this amplitude may be measured by measuring the peak-to-peak value of the carrier (typically 13.56 MHz) by using the output SE from the filtering and adaptation unit 245

The three or five values obtained enable, by interpolation, estimation of the position of the tag 255.

FIG. 5, comprising FIGS. 5a and 5b illustrates the measurement of the amplitude of the component corresponding to the carrier of the signal received at the terminals of a given loop.

FIG. 5a represents a carrier, here a carrier having a frequency of 13.56 MHz, retro-modulated by a tag of which the position is to be estimated. The crenels 500 correspond to the useful component of the signal, that is to say to the bitstream of the response from the tag. By way of illustration, the level of such a signal may be 6 V peak-to-peak for the carrier.

FIG. 5b illustrates the value of the signal SE (505) output from the filtering and adaptation unit 245, obtained for the signal illustrated in FIG. 5a. As illustrated, this value corresponds to the difference between the extreme values of the retro-modulated carrier, that is to say the greatest amplitude over a given time interval.

FIG. 6 illustrates a simplified example of configuration of loops used for estimating the x-coordinate of the position of a tag in a device such as that described with reference to FIG. 2.

As illustrated, the three loops 225'-i, 225'-j and 225'-k, preferably adjacent, here forming columns, are imbricated such that overlapping occurs. However, they are insulated from each other (i.e. there is no electrical contact between those loops).

It is noted that although the loops represented seem to be of different sizes (for clarity of representation), they are in reality, here, of equal or substantially equal sizes.

These loops are used here to estimate the y-coordinate of the position of the tag 255 placed over those loops it being noted that the more the tag of which the position is to be estimated is at the center of a loop, the more the coupling between the tag reader antenna and that loop is mismatched. Therefore, the more the tag of which the position is to be estimated is in the center of a loop, the lower the value measured in the loop of the amplitude of the retro-modulated carrier.

Conversely, the more the tag of which the position is to be estimated is at the edge of a loop, the less the coupling between the tag reader antenna and that loop mismatched Thus, the more the tag of which the position is to be estimated is at the edge of a loop, the higher the value measured in the loop of the amplitude of the retro-modulated carrier.

The measurement of the amplitude of the retro-modulated carrier (signal SE) in the loops 225'-i, 225'-j and 225'-k here gives the values Si, Sj and Sk, respectively. Therefore, given the relative position of the tag 255 with regard to the loops 225'-i, 225'-j and 225'-k, the values of the measurements obtained are ordered in the following way: Sk>Si>Sj.

Locally, the variation in the amplitude of the retro-modulated carrier relative to the distance between the loop used and the tag may be approximated by a parabola (polynomial of order 2). Thus, knowing the values Si, Sj and Sk, it is possible to deduce therefrom the extremum of the parabola locally representing the amplitude of the retro-modulated carrier and, therefore, the y-coordinate of the position of the tag.

FIG. 7 illustrates the theoretical variation 700 of the amplitude of the retro-modulated carrier of a received signal according to the relative positions of the loop used (theoretically) and of the tag as well as the local approximation of the variation of that amplitude by a parabola, on the basis of measurements made using several loops, to deduce therefrom the position of a tag.

As illustrated, the values Si, Sj and Sk measured in the loops 225'-*i*, 225'-*j* and 225'-*k*, correspond to the positions x(i), x(j) and x(k), respectively. The local approximation of the amplitude of the retro-modulated carrier by an order 2 polynomial here leads to the parabola 705. The extremum of this latter enables the x-coordinate of the position of the tag x(t) to be estimated.

The interpolation presented here for estimating the x-coordinate of the position of a tag is advantageously used to estimate its y-coordinate. Furthermore, although it is possible to interpolate the x-coordinate and the y-coordinate of the position of a tag from three measurements made by loops forming columns and three loops forming rows, it is possible to use more loops, for example five loops forming columns and five loops forming rows. The number of loops used for the interpolation of the x-coordinate may be different from the number of loops used for interpolating the y-coordinate.

It is noted that the position of the loops may be regular (the distance between two adjacent loops is constant) or not.

According to a second embodiment, a measurement of the amplitude of the useful component (used for exchanging data) of a received signal (signal SR) is made for each loop to determine the position of a tag.

It is noted here that the level of the signal SR measured in a loop is maximum when the tag is centered on that loop. More particularly, the ratio of surface area between the tag and that loop (situated at least partly under the tag) is such that the loop is more sensitive to the retro-modulation when the tag is centered over that loop. Conversely, the further the tag is from the loop, the lower the level measured for the retro-modulated signal.

Thus, in other words, if the amplitude of the component corresponding to the carrier of the received signal increases with distance (on account of the coupling matching), the amplitude of the useful component (used for exchanging data) of the received signal drops with distance (on account of the drop in power).

Again, the determination of the position of a tag comprises, preferably, two phases, a "search" phase and a "tracking" phase. As indicated earlier, these two phases are not illustrated in FIG. 4 in which, in the interest of clarity, only one measurement is made in systematic manner over the set of loops for each identified tag.

In the "search" phase, the tag of which the position it to be estimated is located approximately, that is to say, for example, to the nearest one or two loops. This first location is performed by sampling the signal SR coming from one loop out of two or one loop out of three (of the set of loops). To be precise, the measured signal (signal SR) presents a local maximum for the rows and a local maximum for the columns situated near the tag of which the position it to be estimated.

In the "tracking" phase, the amplitude of the useful component of the received signal is only measured for the three or five adjacent loops centered on each of the two loops defining the rows and the columns which have presented a local maximum for the signal SR.

This measurement cycle is repeated sufficiently rapidly such that between two series of measurements, the position of the local maximum always remains in a position that is central or offset by one loop at the most. The group of three or five measured loops is chosen dynamically to recenter the local maximum. An extrapolation of the movement of the tag on the basis of the change in the position of the tag over the preceding cycles makes it possible to better locate the local maximum in the current cycle.

In this embodiment, the amplitude of the useful component of the received signal may be measured in the following way: the filtering and adaptation unit 245 demodulates the retro-modulated signal then amplifies it and filters it to supply the signal SR, as described above.

The three or five values obtained from adjacent loops make it possible, by interpolation, to estimate the x-coordinate or the y-coordinate of the position of the tag 255 (these operations are carried out independently for the x-coordinate and the y-coordinate using the loops defining the columns and the loops defining the rows.

This embodiment makes it possible to locate the current tag interrogated while dispensing with constraints such as the presence of undesirable metallic objects on the detection surface.

FIG. 8, comprising FIGS. 8*a*, 8*b* and 8*c*, illustrates the measurement of the average amplitude of the useful component (used to exchange data) of a received signal.

FIG. 8*a* represents a carrier, here a carrier having a frequency of 13.56 MHz, retro-modulated by a tag of which the position is to be estimated. The crenels 800 correspond to the useful component of the received signal, that is to say to the bitstream of the response from the tag. By way of illustration, the level of such a signal may be 6 V peak-to-peak for the carrier. The signal represented in FIG. 8*a* is identical to the signal represented in FIG. 5*a*.

FIG. 8*b* illustrates the useful component (i.e. used to send data) of the retro-modulated signal, that is to say the response bitstream from the tag, of which the value of the signal SR (800), obtained at the output of the filtering and adaptation unit 245, for the signal illustrated in FIG. 8*a* represents the amplitude. The amplitude of such a signal is typically several millivolts.

To improve the accuracy of the values measured, the signal SR does not represent a measured amplitude of the useful component of the retro-modulated signal but an average value obtained by integration, as described above with reference to FIG. 3 (it is to be recalled that as the distribution of the high states is substantially equal to that of the low states, the integration of the retro-modulated signal represents its average amplitude).

Thus a gain, for example a gain equal to 20, is applied to the signal represented in FIG. 8*b*. The result is filtered in a band-pass filter then rendered positive as illustrated in FIG. 8*c* (its amplitude may then be comprised between 0 and 3 volts). The result is then integrated to determine an average value representing the amplitude of the useful component of the retro-modulated signal (signal SR).

The configuration of the loops used to perform measurements of the retro-modulated signal (average amplitude of the useful component) and to deduce therefrom the position of a tag is similar to that described in the first embodiment, with reference to FIG. 6.

However, although the configuration of the loops may be identical or similar, it is to be recalled here that the more the tag of which the position is to be estimated is at the center of a loop, the higher the amplitude of the useful component of the signal received in that loop.

Conversely, the further the tag whose position is to be estimated is from the center of a loop, the lower the amplitude of the useful component of the signal received in that loop.

The measurement of the amplitude of the useful component of the signal received (signal SR) in the loops 225'-*i*, 225'-*j* and 225'-*k* here gives the values Si, Sj and Sk, respectively. Therefore, given the relative position of the tag 255 with regard to the loops 225'-*i*, 225'-*j* and 225'-*k*, the values of the measurements obtained are ordered in the following way: Sj>Si>Sk.

Locally, the amplitude of the useful component of the retro-modulated signal may be approximated by a parabola (order 2 polynomial). Thus, knowing the values Si, Sj and Sk, it is possible to deduce therefrom the extremum of the parabola locally representing the amplitude of the useful component of the retro-modulated signal. The position of this extremum corresponds to the x-coordinate of the tag position.

FIG. 9 illustrates the theoretical variation 900 of amplitude of the useful component of a retro-modulated signal according to the relative positions of the loop used (theoretically) and of the tag as well as the local approximation of the variation of that amplitude by a parabola, on the basis of measurements made using several loops, to deduce therefrom the position of a tag.

As illustrated, the values Si, Sj and Sk measured in the loops 225'-*i*, 225'-*j* and 225'-*k*, correspond to the positions x(i), x(j) and x(k), respectively. The local approximation of the amplitude of the useful component of the retro-modulated signal by an order 2 polynomial here leads to the parabola 905. The extremum of this latter enables the x-coordinate of the position of the tag x(t) to be estimated.

The interpolation presented here for estimating the x-coordinate of the position of a tag is advantageously used to estimate its y-coordinate. Furthermore, although it is possible to interpolate the x-coordinate and the y-coordinate of the position of a tag from three measurements made by loops forming columns and three loops forming rows, it is possible to use more loops, for example five loops forming columns and five loops forming rows. The number of loops used for the interpolating of the x-coordinate may be different from the number of loops used for interpolating the y-coordinate.

Again, the position of the loops may be regular (the distance between two adjacent loops is constant) or not.

To improve the reception sensitivity of the loops used, it is possible to replace each of them by a double loop.

FIG. 10, comprising FIGS. 10*a* and 10*b*, illustrates an example of an arrangement for double loops that are used for measuring response signals from a tag and for determining therefrom the position of that tag.

FIG. 10*a* diagrammatically represents the arrangement of a double loop whereas FIG. 10*b* represents a cross-section view of the device 200 in which double loops are integrated.

As illustrated, each loop 225-*j* of the device 200 is replaced by two loops 225*a*-*j* and 225*b*-*j* situated on respective opposite sides of antenna 215 of the tag reader. Each of these loops is imbricated with adjacent loops (e.g. the loops 225*a*-*i* and 225*a*-*k* for the loop 225*a*-*j* and the loops 225*b*-*i* and 225*b*-*k* for the loop 225*b*-*j*) as described above.

The two terminals of each of the loops 225*a*-*j* and 225*b*-*j* are connected to an impedance adaptor 235*a*-*j* and 235*b*-*j*, respectively, of which the output is linked to a same signal attenuator 240-*j* of which the outputs are connected to the multiplexers 230-1 and 230-2 as described above. Furthermore, one of the terminals of one of the loops 225*a*-*j* and 225*b*-*j* is linked to the equivalent terminal of the other of the loops 225*a*-*j* and 225*b*-*j*, as illustrated.

Each of the loops 225*a*-*j* and 225*b*-*j* is tuned to the frequency of the carrier emitted by the tag reader (typically 13.56 MHz) using impedance adaptors 235*a*-*j* and 235*b*-*j*.

Such an arrangement enables the sensitivity of the device to be increased: the output of the double loop corresponds to the difference between the signals received by each of the loops of the double loop which makes it possible to eliminate a substantial part of the carrier.

When a tag emits a retro-modulation signal above that double loop, each loop thereof receives a retro-modulation signal with a different level (on account of the stacking of the loops). Therefore, the difference in the signals received by these loops makes it possible to receive the retro-modulation signal with less noise.

FIG. 11 illustrates an example of a device enabling the location of different types of tag according to an embodiment of the invention.

The device 200" here comprises the parts 205", 210", 215", 220", 225"-*i*, 225"-*j*, 225"-*k*, 230"-1, 230"-2, 235"-*i*, 235"-*j*, 235"-*k*, 240"-*i*, 240"-*j*, 240"-*k*, 245" and 250" which are similar to the parts 205, 210, 215, 220, 225-*i*, 225-*j*, 225-*k*, 230-1, 230-2, 235-*i*, 235-*j*, 235-*k*, 240-*i*, 240-*j*, 240-*k*, 245 and 250 described with reference to FIG. 2, respectively. The device 200" further comprises other loops forming columns and loops forming rows (not shown).

The device 200" also comprises two multiplexers 1100-1 and 1100-2. As illustrated, the terminals of the vertical loops represented are linked to the multiplexers 1100-1 and 1100-2 and to the multiplexers 230"-1 and 230"-2.

Thus, for example, one of the terminals of the loop 225"-*i* is connected to the multiplexer 1100-1 whereas the other terminal of the loop 225"-*i* is connected to the multiplexer 1100-2. The terminals of the loops 225-*j*" and 225"-*k* are linked in similar manner to the multiplexers 1100-1 and 1100-2.

The other loops not shown are linked in similar manner to the multiplexers 1100-1 and 1100-2.

The multiplexers 1100-1 and 1100-2, as for the multiplexers 230"-1 and 230"-2 are actuated by the microcontroller 205".

As illustrated, the outputs from the multiplexers 1100-1 and 1100-2 are linked to the part 1105 of which the output is itself connected to the microcontroller 205".

The position of a tag is determined using signals coming from the multiplexers 230"-1 and 230"-2 as described above or, alternatively, using the signals coming from the multiplexers 1100-1 and 1100-2.

The signals coming from the multiplexers 1100-1 and 1100-2 are processed in part 1105. This may, for example, be a set of components enabling the implementation of a location system such as that described in patent application FR1255334. Part 1105 then typically comprises a band-pass filter, an automatic gain controller and a demodulator.

Thus, the device 200" may, by using the multiplexers 230"-1 and 230"-2, determine the position of tags of standard type, for example the position of tag 255, and, by using the multiplexers 1100-1 and 1100-2, determine the position of tags of a particular type, in particular the position of the tag 1110, for example of tags such as those described in patent application FR1255334.

Naturally, to satisfy specific needs, a person competent in the field of the invention will be able to apply modifications to the preceding description.

In particular, mobile telephones exist which are equipped with NFC means, in particular Smartphones, capable of activating an NFC tag function such that the telephone behaves like a mobile entity comprising an NFC tag (e.g. Samsung Galaxy S II, Samsung Galaxy Nexus, Samsung, Galaxy and Nexus are trademarks). However, as described above, the method according to the invention applies to any mobile entity provided with a tag using a near field communication technology, and thus also to telephones on which such a tag function can be activated.

The invention claimed is:

1. A device (200) for locating at least one mobile entity provided with at least one tag (255) using a near field communication technology, each said at least one tag (255) comprising a unique identifier, said device comprising:
   an emission means (215) for emitting at least one interrogation signal for interrogating each of said at least one tag;
   a plurality of reception means (225), each of said plurality of reception means for receiving said at least one interrogation signal and for receiving a response signal from said at least one tag; and
   a control means (205, 245) for i) sequentially selecting each of the plurality of reception means (225) to sequentially measure at least one signal received via said selected reception means, said received at least one signal resulting from the at least one interrogation signal emitted by said emission means and a signal emitted by said at least one tag in response to said at least one interrogation signal emitted by said emission means (215) and ii) estimating a position of said at least one tag by interpolating measurements of signals received via each of said reception means.

2. A device according to claim 1, further comprising switching means (230) for sequentially selecting said plurality of reception means, said switching means (230) being controlled by said control means.

3. A device according to claim 1, further comprising adaptation means (235) for tuning said plurality of reception means to the frequency of a carrier of a signal emitted by said emission means.

4. A device according to claim 1, further comprising a specific component (210) connected to said control means and to said emission means for executing specific functions for reading said at least one tag.

5. A device according to claim 1, wherein said control means comprise means for determining a value representing the amplitude of a component corresponding to a carrier of a signal received via said plurality of reception means.

6. A device according to claim 1, wherein said control means comprise means for determining a value representing the amplitude of a useful component of a signal received via said plurality of reception means, said useful component being used for exchanging data.

7. A device according to claim 1, wherein each of said reception means comprise at least one set of loops extending in at least one dimension of a surface on which the position of said at least one tag must be estimated.

8. A device according to claim 1, wherein each of said reception means comprises two parts, each of said two parts being situated on respective opposite sides of said emission means.

9. A device according to claim 1, wherein said emission means and said control means are configured to read at least one item of data stored in memory on said at least one tag or to write at least one item of data on said at least one tag of each of a plurality of mobile entities.

10. A device (200) for locating at least one mobile entity provided with at least one tag (255) using a near field communication technology, said at least one tag (255) comprising a unique identifier, said device comprising:
   an emission means (215) for emitting an interrogation signal for interrogating each of said at least one tag;
   a plurality of reception means (225), said reception means for receiving said interrogation signal and for receiving a response signal from said at least one tag;
   a control means (205, 245) for i) selectively linking to each of the plurality of reception means (225) to sequentially measure signals coming from each of said reception means and ii) for estimating a position of said at least one tag by interpolating measurements of signals received via each of said reception means; and
   selection means (1100-1, 1100-2) and processing means (1105) selectively linked to said plurality of reception means and to said control means, said selection means, said processing means and said control means being configured to determine the position of said at least one tag implementing a communication technology distinct from near field communication technology.

11. A method of locating at least one mobile entity provided with at least one tag (255) using a near field communication technology and each said at least one tag (255) comprising a unique identifier, the method being implemented in a device comprising i) an emission means (215) for emitting at least one interrogation signal for interrogating each of said at least one tag, ii) a plurality of reception means (225), each of said reception means for receiving said at least one interrogation signal and for receiving a response signal from said at least one tag, and iii) a control means (205, 245) for i) selectively linking to each of the plurality of reception means (225) to sequentially measure signals coming from each of said reception means and ii) estimating a position of said at least one tag by interpolating measurements of signals received via each of said reception means, the method comprising the following steps:
   using the emission means (215), actuating emission (412) of the at least one interrogation signal for interrogating each of said at least one tag;
   using the control means, sequentially selecting (420, 430) each of said plurality of reception means and measuring at least one signal received via said selected reception means, said received at least one signal resulting from the at least one interrogation signal emitted by said emission means and a signal emitted by said at least one tag in response to said at least one interrogation signal emitted by said emission means (215); and
   using the control means, estimating (422, 432) the position of said at least one tag by interpolating measurements of signals received via each selected reception means.

12. A locating method according to claim 11, further comprising a first step of estimating an approximate position of said at least one tag and a second step of estimating the position of said at least one tag, said second step of estimating the position comprising said steps of actuating emission of an interrogation signal, sequentially selecting reception means and measuring at least one signal received via said selected reception means and estimating the position of said at least one tag by interpolating measurements of signals received via selected reception means.

13. A locating method according to claim 12, wherein said first step of estimating a position comprises a step of measuring the amplitude of a component corresponding to a carrier of a signal received via said reception means and/or the amplitude of a useful component of a signal received via said reception means, the signal being used for exchanging data.

14. A locating method according to claim 11, further comprising an initial step of obtaining a number of identified tags and of identifiers of the identified tags.

15. A locating method according to claim 14, wherein said steps of actuating emission of an interrogation signal, of sequentially selecting reception means and of measuring at least one signal received via said selected reception means and of estimating the position of said at least one tag by interpolating measurements of signals received via selected reception means are carried out for each identified tag.

16. A locating method according to claim 11, wherein said step of measuring at least one received signal comprises a step of measuring the amplitude of a component corresponding to a carrier or a signal received via said reception means and/or the amplitude of a useful component of a signal received via said reception means, which component is used to exchange data.

17. A locating method according to claim 11, further comprising a step of reading at least one item of data stored in memory on said at least one tag or writing at least one item of data on said at least one tag.

18. A device according to claim 2, further comprising adaptation means (235) for tuning said plurality of reception means to the frequency of a carrier of a signal emitted by said emission means.

19. A device according to claim 2, wherein said control means comprise means for determining a value representing the amplitude of a component corresponding to a carrier of a signal received via said plurality of reception means.

* * * * *